United States Patent
Costa et al.

(10) Patent No.: US 7,216,509 B2
(45) Date of Patent: May 15, 2007

(54) SOL-GEL PROCESS FOR THE PRODUCTION OF HIGH DIMENSIONS DRY GELS AND DERIVED GLASSES

(75) Inventors: Lorenzo Costa, Sommo (IT); Massimo Sparpaglione, S. Donato Milanese (IT)

(73) Assignee: Degussa Novara Technology S.p.A., Novara (IT)

( * ) Notice: Subject to any disclaimer, the term of this patent is extended or adjusted under 35 U.S.C. 154(b) by 601 days.

(21) Appl. No.: 10/332,096

(22) PCT Filed: Jun. 21, 2001

(86) PCT No.: PCT/EP01/07027

§ 371 (c)(1),
(2), (4) Date: Jul. 31, 2003

(87) PCT Pub. No.: WO02/04370

PCT Pub. Date: Jan. 17, 2002

(65) Prior Publication Data

US 2004/0025537 A1    Feb. 12, 2004

(30) Foreign Application Priority Data

Jul. 10, 2000    (IT)    .................... MI2000A1546

(51) Int. Cl.
   C03B 8/00    (2006.01)
(52) U.S. Cl. ...................................... 65/17.2
(58) Field of Classification Search ............... 65/17.2, 65/395
   See application file for complete search history.

(56) References Cited

U.S. PATENT DOCUMENTS

| 4,317,668 | A |   | 3/1982  | Susa et al. |
| 4,622,056 | A | * | 11/1986 | Matsuo et al. ............... 264/621 |
| 4,680,045 | A | * | 7/1987  | Osafune et al. .............. 65/396 |
| 4,981,819 | A | * | 1/1991  | Rinn ........................... 501/12 |
| 5,240,488 | A |   | 8/1993  | Chandross et al. |
| 5,250,096 | A | * | 10/1993 | Bruce et al. ................. 65/390 |
| 5,849,331 | A | * | 12/1998 | Ducheyne et al. .......... 424/484 |
| 5,866,027 | A | * | 2/1999  | Frank et al. ................. 252/62 |
| 6,017,505 | A |   | 1/2000  | Ziegler et al. |
| 6,131,305 | A | * | 10/2000 | Forbert et al. ............... 34/342 |
| 6,299,822 | B1 | * | 10/2001 | Yoon et al. .................. 264/621 |
| 6,562,408 | B1 | * | 5/2003  | Costa et al. ............. 427/376.2 |
| 6,656,527 | B1 | * | 12/2003 | Gessner et al. ............. 427/246 |

FOREIGN PATENT DOCUMENTS

| GB | 2 170 799 A |   | 8/1986 |
| JP | 62265129 A  | * | 11/1987 |

OTHER PUBLICATIONS

International Search Report, dated Oct. 27, 2001, for International Patent Application No. PCT/EP01/07027 (3 pages).

* cited by examiner

*Primary Examiner*—Dionne Walls Mayes
*Assistant Examiner*—Queenie Dehghan
(74) *Attorney, Agent, or Firm*—Smith, Gambrell & Russell, LLP

(57) ABSTRACT

It is described a sol-gel process that allows to obtain dry gels, and possibly the corresponding dense glassy bodies, having higher dimensions compared to similar known processes.

23 Claims, No Drawings

SOL-GEL PROCESS FOR THE PRODUCTION OF HIGH DIMENSIONS DRY GELS AND DERIVED GLASSES

This application claims the benefit of PCT/EP01/07027 filed on Jun. 21, 2001.

The present invention is about a sol-gel process for the production of dry gels based on silicon oxide of high dimensions, that may be densified obtaining glassy or ceramic-glass bodies having corresponding shape and chemical composition; in the following glassy or ceramic-glass materials and bodies are simply referred to as glassy or glasses.

As it is known, by the name "sol-gel" it is meant a broad range of techniques for the production of dry gels, that may possibly be densified to yield the corresponding glass bodies. The dry gels may be used as supports for catalysis or in the thermal insulation field, while the glasses have many technological applications, in particular in the field of optics. The dry gels may only be obtained through the sol-gel route. Glasses are traditionally produced by melting mixtures of powders of suitable composition and subsequent solidification of the melt. Contrary to traditional techniques, sol-gel processes start from solutions of precursors of the desired materials and avoid passing through melting operations. Although the technique allows for a broad range of modifications, all sol-gel processes have in common the following phases:

production of a aqueous or hydro-alcoholic solution or, more frequently, of a suspension, of at least a compound $MX_n$, generally defined as precursor, containing a cation M at least three-valent and preferably tetravalent, whose glassy oxide formation is desired;

hydrolysis, catalysed by acids or bases, of the precursor (or precursors) in the solution or suspension, with formation of M—OH groups, as shown in the reaction:

$$MX_n + nH_2O \rightarrow M(OH)_n + nHX \quad (I)$$

The thus obtained mixture, that may be a solution or a colloidal suspension, is defined as sol;

polycondensation of M—OH groups according to the reaction:

$$M—OH + M—OH \rightarrow M—O—M + H_2O \quad (II)$$

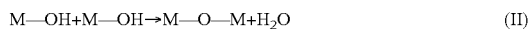

with formation of an oxidic polymer, defined gel, that takes the whole volume originally occupied by the solution. This phase is defined gelation;

drying of the gel obtaining a dry gel formed of a porous monolithic body, having apparent density (weight divided by the geometric volume of the monolithic body) comprised between about ½₀ and ⅓ of the theoretical density of the corresponding non-porous oxide; drying may be realized by controlled evaporation of the solvent, obtaining a body defined in the field as "xerogel", or by supercritical extraction of the solvent, obtaining a so-called "aerogel"; as given above, the dry gel may find industrial applications as such, or it can be submitted to densification by thermal treatment, obtaining a glassy body of theoretical density.

Sol-gel techniques have been studied since long for the replacement of traditional techniques in the industrial production of glasses because, allowing a better control of any process parameters, these make possible obtaining higher purity or metastable compositions, that cannot be obtained passing through a melting phase.

Sol-gel processes for producing glassy bodies, either of silicon oxide alone or of mixed oxides, are described in many patents. Patents U.S. Pat. No. 4,324,576 and U.S. Pat. No. 5,076,980 describe sol-gel processes wherein alkoxides are employed as precursors of the cations whose oxide formation is desired. In the common case of the production of glassy bodies of silicon oxide the more commonly used alkoxides are tetramethoxyortosilane, Si—(O—CH₃)₄, generally referred to in the field as TMOS, and tetraethoxyortosilane, Si—(O—CH₂—CH₃)₄, generally referred to in the field as TEOS. In these processes, hydrolysis of alkoxides is generally carried out at pH values of about 2–3, while gelation is caused to happen at pH values higher than 5. Although the techniques starting from alkoxides are those whose realization is more easy, these haven't found wide industrial application due to the difficulties in obtaining glassy bodies of medium or big size. In fact, in this case, the result of gelation is an inorganic polymer with pores of dimensions in the range of nanometers where the reaction solvent is contained. Solvent extraction is troublesome due to the extremely intense capillary forces exerted by the solvent on the walls of such tiny pores, that often lead to destruction of the dry gel. Moreover, the sols that are obtained through this route have low concentration of silicon, resulting in final dense bodies of generally small dimensions. Finally, alkoxides are rather costly.

In order to overcome the drawbacks of the previous patents, patents U.S. Pat. No. 4,680,048, U.S. Pat. No. 4,681,615, U.S. Pat. No. 5,207,814 and European application EP-A-586013 disclose the addition of silica to the sol obtained starting form alkoxides. Silica may be of pyrogenic or colloidal kind. Pyrogenic silica is a form of extremely fine silica powder, with particles of dimensions of about 10 nanometers, generally produced by burning silicon tetrachloride according to the following reaction:

$$SiCl_4 + O_2 \rightarrow SiO_2 + 2\ Cl_2 \quad (III)$$

Pyrogenic silica is produced and sold by various firms, for instance by Cabot Corp. under the tradename "Cab-O-Sil", by Wacker Chemie GmbH under the tradename "Wacker HDK", by Degussa Huls AG under the tradename "Aerosil", by Dow Corning Corp. under the tradename "D.C. Silica" and by PPG Corp. under the tradename "ARC Silica". Colloidal silica is normally obtained by precipitation from solution, and it is available for instance from DuPont under the tradename "Ludox".

In these processes too hydrolysis is carried out at values of about 2–3, and gelation is favoured by the addition of a reagent that raises the pH. These processes, while solving the low-productivity problem of the previous processes, still imply the use of high-cost alkoxides and add an operation to the overall process. Moreover, with these processes too the microstructure of the wet gel comprises extremely fine pores, so that in this case too drying of the gels is troublesome and a not-negligible percentage of the dry gels thus obtained show cracks or breaks. Patent U.S. Pat. No. 5,240,488 discloses a process wherein it is formed a silica-only sol kept at a very high pH (for instance, pH 12, obtained by addition of an excess of tetramethylammonium hydroxide) to stabilize it against sudden gelation, and to the sol it is added at least one polymeric compound and a polyalcohol. The polymer is preferably nitrogenated, and more preferably it is a polymer chosen among polyamides, polyethyloxazoline, polymethyloxazoline and polyacrylamide, while the polyalcohol ispreferably glycerol. These additives, that are then removed during subsequent thermal treatments, have the function of modifying the composition of the inner surface of pores thus enhancing the strength of the gel during drying phase. According to the process of this patent, hydrolysis of the sol takes place at a basic pH value and gelation is caused to happen by the addition of an hydrolizable ester, for instance methylformiate, that lowers pH at values below 11 or even below 10. This process is rather complex, and requires the fine control of a number of parameters, such as reagents concentration and timing of the different phases.

From the reading of the cited patents, and in particular the last one, it results clear that the most critical phase in a sol-gel process is gelation. During this phase in fact the microstructure of the gel is formed, and as given above the mechanical resistance of such a gel and the possibility of submitting it to subsequent treatment of drying and densification avoiding that this develops strains or breaks depend from this microstructure and from distribution of porosity in the gel.

These problems are the worse the bigger is the dry gel to be produced. Particularly, it is commonly acknowledged in the field that tridimensional gels where any of the three lateral dimensions exceed about 2 cm are impossible to produce in practice, apart from the production of unique samples and on a laboratory scale. In the following, with the definition of big size gels it will be meant gels having all of the three lateral dimensions greater than about 2 cm.

Object of the present invention is to provide a sol-gel process that allows to overcome the drawbacks of the prior art, and in particular to provide a sol-gel process that is simple and that allows the production of big size gels with good yield and at low cost, that may then be submitted to densification treatments for the production of the corresponding glassy bodies.

This object is obtained according to the present invention with a sol-gel process comprising the operations of:
preparing a composition A comprising pyrogenic silica and an aqueous solution of an acid, such that the molar ratio $H_2O/SiO_2$ in composition A is equal or lower than 20 and its pH is equal or lower than 1.5;
preparing a composition B comprising silica and an aqueous solution of a base not containing metallic cations, such that the molar ratio $H_2O/SiO_2$ in composition B is comprised between 6 and 40 and its pH is comprised between 10.5 and 13;
forming a composition C by mixing composition A and composition B in such a ratio that the molar ratio between silica from composition A and silica from composition B is comprised between about 1:2 and 3:1, the pH of composition C is comprised between 1 and 5 and the molar ratio $H_2O/SiO_2$ is comprised between about 5 and 15;
allowing gelation of composition C;
substituting water present in the gel pores and in the vessel where the gel is contained with an non-protic liquid miscible with water;
drying the gel by evaporation or supercritical extraction of the non-protic liquid.

The process of the invention may optionally be followed by the operations necessary to densification of the dry gel to yield a glass.

The inventors have found that by using silica powder only as precursor material, initially subdivided into a strongly acid composition and a strongly basic one that are then united in suitable ratio, it is possible to obtain dry gels with microstructural characteristics that are superior to those of gels obtained by using alkoxides; these microstructural characteristics are reflected in the mechanical characteristics of the gels, than can be obtained in the form of bodies in which all of the three lateral dimensions are greater than about 2 cm.

For the preparation of composition A it is only possible to use as starting material silica of the pyrogenic kind, such as e.g., "Aerosil OX-50" of the firm Degussa-Huls AG. This composition is prepared by mixing silica with an acid in aqueous solution.

Molar ratio $H_2O/SiO_2$ in composition A is lower than 20, as higher ratios would result in an excessive dilution of the final composition C, such that to make difficult, if not impossible, to form a gel from this latter composition.

The lower limit of molar ratio $H_2O/SiO_2$ in composition A is not strictly fixed and it's determined from silica concentration and pH of composition B, because it must be guaranteed that composition C has a molar ratio $H_2O/SiO_2$ comprised between 5 and 15 and pH comprised between 1 and 5. As composition B may be prepared with a very high molar ratio $H_2O/SiO_2$, it follows that composition A may have, for the same molar ratio, very low values.

Depending on the molar ratio between water and silica, composition A may look like a powder or a liquid phase. In particular, at molar ratios $H_2O/SiO_2$ below about 0.5 the thermodynamically stable form of composition A is such that the aqueous solution of acid is present as microscopic droplets whose surface is covered with a layer of pyrogenic $SiO_2$ particles, making composition A looking as a dry powder; when molar ratio $H_2O/SiO_2$ is over the previously given limit, a gradual transition takes place until when, for values of the molar ratio $H_2O/SiO_2$ higher than about 1, composition A is stable as a suspension of silica in the aqueous solution of the acid.

The pH of composition A must be lower than 1.5. In case of molar ratios $H_2O/SiO_2$ comparatively high in composition A, the value of pH can be directly measured with a pH-meter, while in the case of very low ratios as stated above composition A has the look of the a powder, in which case its pH can be approximated to that of the starting acidic solution.

The inventors have verified that it is operatively simpler, and thus preferable, to keep the molar ratio $H_2O/SiO_2$ in composition A at the lowest possible values. In this preferred condition composition A will thus contain a very limited amount of liquid phase. As this liquid phase must contain all of the acid needed to make sure that composition C has pH comprised between 1 and 5, it will be necessary to use in the preparation of composition A aqueous solutions of the acid wherein this latter is at very high concentration. Optimum acidic solutions have resulted to be the aqueous solutions of HCl or $HNO_3$ at pH lower than 1, and in particular those at the highest possible stable concentration of acid, such as the solution of HCl in water at 32% by weight of acid, or the solution of $HNO_3$ in water at 65% by weight of acid.

Contrary to composition A, that may only be produced using pyrogenic silica, in the preparation of composition B it is possible to use any form of solid silica in powder with particles of dimensions lower than 100 nm. For instance, it is possible to use the same pyrogenic silica of composition A, but also colloidal silica obtained by precipitation, as long as this has the suitable purity.

Molar ratio $H_2O/SiO_2$ in composition B may be comprised between 6 and 40. In composition B it is necessary to push as much as possible silica hydrolysis. At ratios below 6 difficulties are met with silica hydrolysis, with formation of aggregates than can affect homogeneity and mechanical characteristics of the final gel, while at ratios higher than 40 the same problems are met of difficult gelation of composition C as previously described with reference to the preparation of composition A; preferably, such ratio is comprised between about 8 and 30.

Composition B is basic due to addition of a base that doesn't contain metallic cations, such as ammonium hydroxide or a aqueous solution of organic amines such as monomethylamine, dimethylamine, ethylendiamine. The pH of composition B is comprised between about 10.5 and 13. At pH values lower than 10.5 the hydrolysis rate of silica is practically negligible, while pH values higher than 13 would require too high amounts of acid in composition A, without offering advantages in silica hydrolysis in composition B. For the objectives of the invention, composition B has preferably a value of pH slightly higher than 10.5.

Composition A and B prepared as hereinabove described are mixed to form composition C, in ratios such that the molar ratio between silica coming from composition A (referred to in the following also as $SiO_2(A)$) and silica coming from composition B (referred to in the following also as $SiO_2(B)$) is comprised between about 1:2 and 3:1. At values of the ratio $SiO_2(A)/SiO_2(B)$ below about 1:2 the process productivity becomes low, while at ratios higher than 3:1 the final dry gel results fragile.

Moreover, composition C must have a molar ratio $H_2O/SiO_2$ comprised between 5 and 15: at lower ratios there are difficulties in obtaining homogeneity in composition C with negative consequences on the mechanical characteristics of the final gels, while at higher ratios there are difficulties in gelation.

Finally, composition C must have a pH value comprised between 1 and 5 and preferably between 1.5 and 3. At pH values lower than 1 it is necessary to use a great amount of base to bring sol to gelation and the process has thus little efficiency, while at values higher than 5 gelation is practically immediate at the moment of mixing of compositions A and B, so that it is not possible to have homogenization of these two. In the indicated pH range, gelation rate is higher when the pH is higher.

It is preferable that gelation does not take place too quickly after mixing of compositions A and B, such that there is time to reach pH homogeneity throughout composition C; a gelation of composition C not too fast after its formation also allows evaluation and adjustment of parameters such as $SiO_2$ concentration or pH. As a consequence, it is preferable to operate in such a way that composition C at the moment of its formation has a pH comprised between about 1.5 and 3; once it's been verified the obtainment of a homogeneous composition C, pH may be then raised to a value comprised between 4 and 5 by slow addition and under stirring of a base, e.g. $NH_4OH$, thus allowing rapid gelation.

Any operations so far described for the preparation of compositions A, B and C may be carried out under ultrasound stirring, that favors dispersion and homogenization of suspensions or solutions of silica in aqueous medium.

Conditions given above for composition C, taken together, are used to define exact formulation of compositions A and B.

For instance, let's consider that case where a composition B has been prepared with a molar ratio $H_2O/SiO_2$ of 20 and the preparation of a composition C is desired wherein the molar ratio $H_2O/SiO_2$ is equal to 15 and with ratio $SiO_2(A)/SiO_2(B)$ 1:1. As two moles of silica will need 30 moles of water, and as 20 moles of water will come from composition B, it will be necessary to use a composition A in which the molar ratio $H_2O/SiO_2$ is equal to 10. On the contrary, in case composition A is obtained from a concentrated acid, for instance $HNO_3$ at 65% by weight, it can be approximated that all of the water needed for composition C must initially be present in composition B.

Other examples of mixing ratios of compositions A and B as a function of the desired composition C can be easily similarly derived from those skilled in the art.

Analogously, calculations for obtaining a pH value in composition C comprised between 1 and 5 (or, according to the preferred embodiment, between 1.5 and 3) may be easily performed by those skilled in the art, once known volumes and pH values of compositions A and B. As an alternative, compositions and pH values of compositions A and B that mixed give rise to a composition C of desired characteristics, may be empirically derived with trial tests.

In order to control gelation rate of composition C it is possible to operate, apart from pH, also on temperature. Gelation rate is in fact the higher the higher the temperature. As a consequence, in a preferred embodiment of the process of the invention, compositions A, B and C are kept at a temperature lower than 10° C., and preferably of about 0° C., up to the moment of mixing of compositions A and B and subsequently during all the time needed to make sure that composition C is homogeneous. In this way, all chemical reactions are slowed down, and in particular polycondensation leading to gel formation, while interdiffusion of solutions that allows obtaining a homogeneous pH throughout the liquid volume is not slowed down. Temperature may then be let naturally raise up to ambient one, or it is possible to introduce the container of composition C into a laboratory oven, kept at a temperature generally comprised between 30 and 50° C.

The thus obtained wet gel is then subjected to an operation by which water present in the pores is changed with a liquid that is non-protic but miscible with the same water, that may be a keton of low molecular weight or tetrahydrofuran; preferred solvent for this change is acetone.

The gel resulting from the solvent exchange can be dried by normal evaporation, possibly placing it in a container with a wall permeable to the solvent vapors, capable to avoid a too high evaporation rate so as to reduce at a minimum the risk of breaks in the gel. Preferably, drying of the gel is carried out supercritically. In this case, it is possible to carry out supercritical extraction of the non-protic liquid with which water has been replaced. It may however be preferable to carry out a further exchange of the non-protic liquid of the previous exchange with an organic compound, liquid in its turn, showing lower values of supercritical pressure and temperature, of which supercritical extraction is carried out. The preferred solvent for this purpose is ethyl acetate, having critical temperature (Tc) and critical pressure (Pc) respectively equal to 250.4° C. and 37.8 bars. Other liquids suitable for the aims of the invention, and their critical constants, are:

| | | |
|---|---|---|
| Methyl propionate | Tc = 257.4° C. | Pc = 39.3 bars |
| Propyl formiate | Tc = 264.9° C. | Pc = 40.1 bars |
| Ethyl propionate | Tc = 272.9° C. | Pc = 33,0 bars |
| Propyl acetate | Tc = 276.0° C. | Pc = 32.9 bars |
| Methyl butyrate | Tc = 281.0° C. | Pc = 34.3 bars |
| n-pentane | Tc = 196.6° C. | Pc = 33.4 bars |
| n-hexane | Tc = 234.2° C. | Pc = 29.9 bars |

Conditions of solvent supercritical extraction are well known to the experts in the field of sol-gel and described in a large number of patents, among which for instance patents U.S. Pat. No. 4,432,965 and U.S. Pat. No. 4,806,328, that can be referred to for details on this technique.

The dry gels obtained according to the so far described process may than be densified to the corresponding glasses with suitable thermal treatments. These treatments are well known to the experts in this field and comprise generally a first treatment in an oxygen or air flow up to temperatures of about 500° C., for the removal by burning of the remainders of organic solvents possibly left in the gel by the supercritical extraction; a treatment up to about 800° C. in an atmosphere of chlorine, hydrogen chloride or carbon tetrachloride, or possibly one of these gases diluted in an inert gas such as helium; by this treatment are removed the possible traces of water or —OH radicals and the metallic impurities that may be present in the gel, such as described for instance in patents U.S. Pat. No. 4,317,668 and U.S. Pat. No. 4,426,216; finally, a treatment up to the densification temperature, of about 1300° C., in a inert gas flow, e.g. helium, or of an inert gas containing slow percentages of oxygen.

The invention will be further illustrated by the following examples. These non-limitative examples illustrate some embodiments meant to teach to the experts in the field how to practice the invention and to represent the best mode contemplated for realization of the invention.

EXAMPLE 1

It is prepared a composition A comprising silica in an aqueous acid solution, adding 333 g of pyrogenic silica "Aerosil OX-50" of the firm Degussa-Huls AG, slowly and under mechanical stirring, to 0.5. liters of a solution of HCl of concentration 0.62 M in a glass flask. After silica addition has been completed, stirring of composition A is continued for half a hour and then the composition is brought at a temperature of about 0° C. placing the flask in a laboratory refrigerator. Separately it is prepared a composition B comprising silica in a basic aqueous solution, adding 222 g of pyrogenic silica "Aerosil OX-200", slowly and under mechanical stirring, to 1 liter of a solution of $NH_4OH$ of concentration 0.3 M in a glass flask. After silica addition has been completed, the sol is stirred for a further half a hour and then brought at a temperature of about 0° C. placing the flask in a laboratory refrigerator. The whole volume of composition A is united to composition B in a polypropylene beaker having diameter of about 15 cm, placed in a bath refrigerated at 2° C. The mixture is maintained under vigorous stirring during five minutes; it is thus formed composition C, that is brought to pH 4 through addition of ammonia of concentration 0.05 M. Stirring is then interrupted, the beaker is extracted from the refrigerating bath and its content is poured into four cylindrical teflon dies of diameter 9 cm, reaching a filling height of 4 cm in each die, and then the temperature of the sol is allowed to naturally raise. Gelation requires about 3 hours. After gelation the wet gels are subjected to two exchanges of the liquid in the pores and in the container, by substituting first water initially present with acetone, and then this with ethyl acetate. The thus obtained wet gel is supercritically dried in an autoclave with inner volume of 9 liters wherein it is realized pre-pressurization with nitrogen at 50 bars. Supercritical drying is carried out by bringing the inner of the autoclave at 280° C. and 50 bars. A dry gel of cylindrical shape of diameter 9 cm and height 4 cm is extracted from the autoclave. The dry gel has good mechanical strength and it appears homogeneous and with no defects at visual inspection.

EXAMPLE 2

A dry gel specimen produced in example 1 is subjected to a densification treatment for the obtainment of a silica glass, according to the following schedule:

heating from room temperature to 500° C. during 6 hours in an air flow, and keeping at these latter conditions during 8 hours;

heating from 500° C. to 800° C. during 3 hours, and keeping of the last reached temperature for 2 hours in a flow of helium containing 5% by volume of anhydrous HCl;

heating from 800° C. to 1350° C. during 3 hours in a helium flow, and keeping of the last temperature for 10 minutes;

natural cooling down to 300° C., and extraction of the specimen from the oven.

The obtained sample does not show defects, has density of 2.2 g/cm$^3$ and has good transmittance in the visible, UV and near IR range.

The invention claimed is:

1. Sol-gel process for the production of tridimensional dry gels having all of the three lateral dimensions higher than about 2 cm, comprising the operations of:
    preparing a composition A comprising pyrogenic silica powder and an aqueous solution of an acid, such that the molar ratio $H_2O/SiO_2$ in composition A is 20 or lower and its pH is equal to or lower than 1.5;
    preparing a composition B comprising silica powder and an aqueous solution of a base not containing metallic cations, such that the molar ratio $H_2O/SiO_2$ in composition B is between about 6 and 40 and its pH is between 10.5 and 13;
    forming a homogeneous composition C by mixing composition A and composition B in such a ratio that the molar ratio between silica from composition A and silica from composition B is between about 1:2 and 3:1, and whereby the pH of composition C is between 1 and 5 and the molar ratio $H_2O/SiO_2$ is between 5 and 15;
    allowing gelation of composition C to obtain a wet gel;
    substituting water present in pores of the gel with a non-protic liquid miscible with water;
    drying the gel by evaporation or supercritical extraction of the non-protic liquid.

2. Process according to claim 1 wherein the molar ratio $H_2O/SiO_2$ in composition A is lower than about 0.5.

3. Process according to claim 1 where composition A is prepared with an aqueous solution of an acid which is HCl or $HNO_3$ having a pH lower than 1.

4. Process according to claim 3 wherein said solution is a solution containing 32% by weight of HCl in water.

5. Process according to claim 3 wherein said solution is a solution containing 65% by weight of $HNO_3$ in water.

6. Process according to claim 1 wherein the molar ratio $H_2O/SiO_2$ in composition B is between about 8 and 30.

7. Process according to claim 1 wherein composition B is prepared with an aqueous solution of a base not containing metallic cations.

8. Process according to claim 7 wherein the base is ammonium hydroxide.

9. Process according to claim 7 wherein the base is chosen among monomethylamine and/or dimethylamine and/or ethylene diamine.

10. Process according to claim 1 wherein, at the moment of its formation, composition C has a pH comprised between about 1.5 and 3.

11. Process according to claim 10 wherein the pH of composition C is raised before gelation to a value comprised between about 4 and 5.

12. Process according to claim 1 wherein composition C is formed by mixing compositions A and B having a temperature lower than 10° C.

13. Process according to claim 12 wherein said temperature is about 0° C.

14. Process according to claim 12 wherein the temperature of composition C is raised, before gelation, to a value between room temperature and 50° C.

15. Process according to claim 1 wherein said non-protic liquid is a low molecular weight ketone or tetrahydrofuran.

16. Process according to claim 15 wherein said non-protic liquid is acetone.

17. Process according to claim 1 wherein, before super-critical extraction, said non-protic liquid is substituted from the pores of the gel with a liquid organic compound selected from the group consisting of methyl propionate, propyl formiate, ethyl propionate, propyl acetate, methyl butyrate, n-pentane and n-hexane.

18. Process according to claim 17 wherein the gel is dried by supercritical extraction of said liquid organic compound.

19. Process according to claim 1 further comprising a thermal treatment for the densification of the dry gel to the corresponding glass.

20. Process according to claim 19 wherein said treatment comprises the following phases:
 treatment in an oxygen or air flow from room temperature up to a temperature of about 500° C.
 treatment up to about 800° C. in an atmosphere of chlorine, hydrogen chloride, carbon tetrachloride or one of these gases diluted in an inert gas;
 treatment up to the temperature of densification to glass in a flow of an inert gas or of an inert gas containing oxygen.

21. Process according to claim 20 wherein the inert gas is helium.

22. Silica glasses produced according to claim 19.

23. Silica dry gels produced according to claim 1.

* * * * *